United States Patent
Seo et al.

(10) Patent No.: US 10,967,847 B2
(45) Date of Patent: Apr. 6, 2021

(54) CONTROLLING METHOD OF RPM FLARE OF TRANSMISSION FOR HYBRID VEHICLE

(71) Applicants: Hyundai Motor Company, Seoul (KR); Kia Motors Corporation, Seoul (KR)

(72) Inventors: Won Woo Seo, Incheon (KR); Young Kwan Ko, Seoul (KR); Hoon Han, Gyeonggi-do (KR); Jae Young Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 385 days.

(21) Appl. No.: 16/039,007

(22) Filed: Jul. 18, 2018

(65) Prior Publication Data
US 2019/0168733 A1    Jun. 6, 2019

(30) Foreign Application Priority Data
Dec. 6, 2017 (KR) .................. 10-2017-0166567

(51) Int. Cl.
*B60W 10/08* (2006.01)
*B60W 20/00* (2016.01)
*B60W 30/188* (2012.01)

(52) U.S. Cl.
CPC ............ *B60W 10/08* (2013.01); *B60W 20/00* (2013.01); *B60W 30/188* (2013.01); *B60W 2400/00* (2013.01); *B60W 2710/083* (2013.01); *B60W 2710/1022* (2013.01); *B60W 2900/00* (2013.01)

(58) Field of Classification Search
CPC .... B60W 10/08; B60W 20/00; B60W 30/188; B60W 2900/00; B60W 2710/083; B60W 2710/1022; B60W 2400/00; B60W 2710/1011; B60W 10/11; B60W 10/02; B60W 30/19; B60K 2006/4825; B60K 6/48
See application file for complete search history.

(56) References Cited

U.S. PATENT DOCUMENTS

| | | | |
|---|---|---|---|
| 2005/0181907 A1* | 8/2005 | Colvin | B60K 6/547 477/3 |
| 2012/0296117 A1* | 11/2012 | Wu | C07C 277/08 562/560 |
| 2013/0296117 A1* | 11/2013 | Shelton | B60W 30/19 477/5 |

* cited by examiner

*Primary Examiner* — Thomas Ingram
(74) *Attorney, Agent, or Firm* — Mintz Levin Cohn Ferris Glovsky and Popeo, P.C.; Peter F. Corless

(57) ABSTRACT

A method for controlling revolutions per minute (RPM) flare, in which an RPM of a transmission increases due to clutch slip, for a hybrid vehicle can include: determining whether gear-shifting is performed in a transmission of the hybrid vehicle; detecting whether RPM flare of the transmission occurs when it is determined that the gear-shifting is performed; and controlling a torque of a motor of the hybrid vehicle so as to reduce the RPM flare of the transmission by reducing the torque of the motor when the RPM flare of the transmission is detected.

6 Claims, 5 Drawing Sheets

CONTROLLING METHOD OF RPM FLARE OF TRANSMISSION FOR HYBRID VEHICLE

CROSS-REFERENCE TO RELATED APPLICATION

This application is based on and claims the benefit of priority to Korean Patent Application No. 10-2017-0166567, filed on Dec. 6, 2017 in the Korean Intellectual Property Office, the disclosure of which is incorporated herein in its entirety by reference.

TECHNICAL FIELD

The present disclosure relates generally to vehicular technologies and, more particularly, to a method of controlling RPM flare of a transmission for a hybrid vehicle.

BACKGROUND

In light of recent demands for improved fuel efficiency and strengthened gas emission regulations, eco-friendly vehicles, such as hybrid and electric vehicles, have been developed.

The hybrid vehicle, which includes an engine and a motor, may improve energy efficiency and reduce exhaust gas by activating the engine and/or the motor depending on driving situations. When the hybrid vehicle performs gear-shifting, the vehicle releases the hydraulic pressure applied to the clutch of the present gear stage, applies initial-fill hydraulic pressure to a next gear stage to be shifted before applying hydraulic pressure for the lock-up of the clutch of the next gear stage to be shifted, and then applies the hydraulic pressure to the clutch of the next gear stage to be shifted in correspondence with the slop of the hydraulic pressure released from the present gear stage.

Conventionally, however, when the hydraulic pressure control of the transmission is unstable, a phenomenon known as "revolutions per minute (RPM) flare" occurs in which, as the clutch is open (e.g., due to clutch slip), a turbine RPM of the transmission rapidly increases. Although the RPM flare is controlled using the hydraulic pressure of the transmission to reduce the RPM flare, the RPM flare may be not precisely controlled. Additionally, due to the clutch slip, gear-shifting can be negatively affected, and the clutch may be damaged.

SUMMARY

The present disclosure has been made to solve the above-mentioned problems occurring in the related art while advantages achieved by the prior art are maintained intact.

An aspect of the present disclosure provides an improved method for controlling RPM flare in the transmission of a hybrid vehicle which reduces the RPM flare by controlling the motor torque when the RPM flare occurs.

The technical problems to be solved by the present disclosure are not limited to the aforementioned problems, and any other technical problems not mentioned herein will be clearly understood from the following description by those skilled in the art to which the present disclosure pertains.

According to embodiments of the present disclosure, a method for controlling revolutions per minute (RPM) flare, in which an RPM of a transmission increases due to clutch slip, for a hybrid vehicle can include: determining whether gear-shifting is performed in a transmission of the hybrid vehicle; detecting whether RPM flare of the transmission occurs when it is determined that the gear-shifting is performed; and controlling a torque of a motor of the hybrid vehicle so as to reduce the RPM flare of the transmission by reducing the torque of the motor when the RPM flare of the transmission is detected.

The controlling of the torque of the motor can include reducing the torque of the motor based on a degree of the RPM flare of the transmission until a time at which the RPM flare of the transmission is maximized.

The controlling of the torque of the motor can further include after the RPM flare of the transmission is reduced, recovering the torque of the motor to a value of the torque of the motor before the RPM flare of the transmission occurred.

The detecting of whether the RPM flare of the transmission occurs can include determining that the RPM flare of the transmission occurs when a difference between an RPM of the motor and an RPM flare control target speed of the transmission is greater than a specific RPM flare reference speed of the transmission.

The method can further include calculating the RPM flare control target speed of the transmission according to the following equation:

RPM flare control target speed=an output RPM of a transmission/current driving gear ratio of the transmission×LPF, wherein "LPF" denotes a low-pass filter.

The method can further include determining whether the RPM flare of the transmission is sufficiently reduced after reducing the RPM flare of the transmission.

The method can further include: determining whether the gear-shifting is performed in the transmission when the RPM flare of the transmission is sufficiently reduced; and controlling the torque of the motor so as to reduce the RPM flare of the transmission when the RPM flare of the transmission is present.

The gear-shifting can include upshifting or downshifting.

BRIEF DESCRIPTION OF THE DRAWINGS

The above and other objects, features and advantages of the present disclosure will be more apparent from the following detailed description taken in conjunction with the accompanying drawings.

Figure 1:
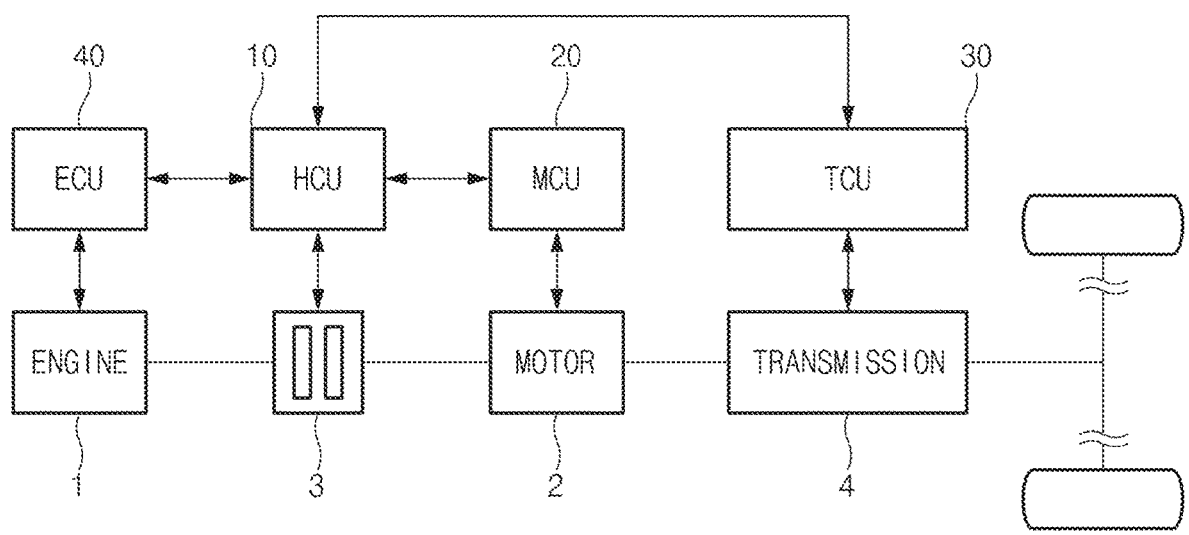
FIG. 1 is a schematic view illustrating the elements of a typical hybrid vehicle.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In the following description, the same reference numerals will be assigned to the same elements even though the elements are illustrated in different drawings. In addition, in the following description, a detailed description of well-known features or functions will be ruled out in order not to unnecessarily obscure the gist of the present disclosure.

The terminology used herein is for the purpose of describing particular embodiments only and is not intended to be limiting of the disclosure. In the following description of elements according to embodiments of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 2:
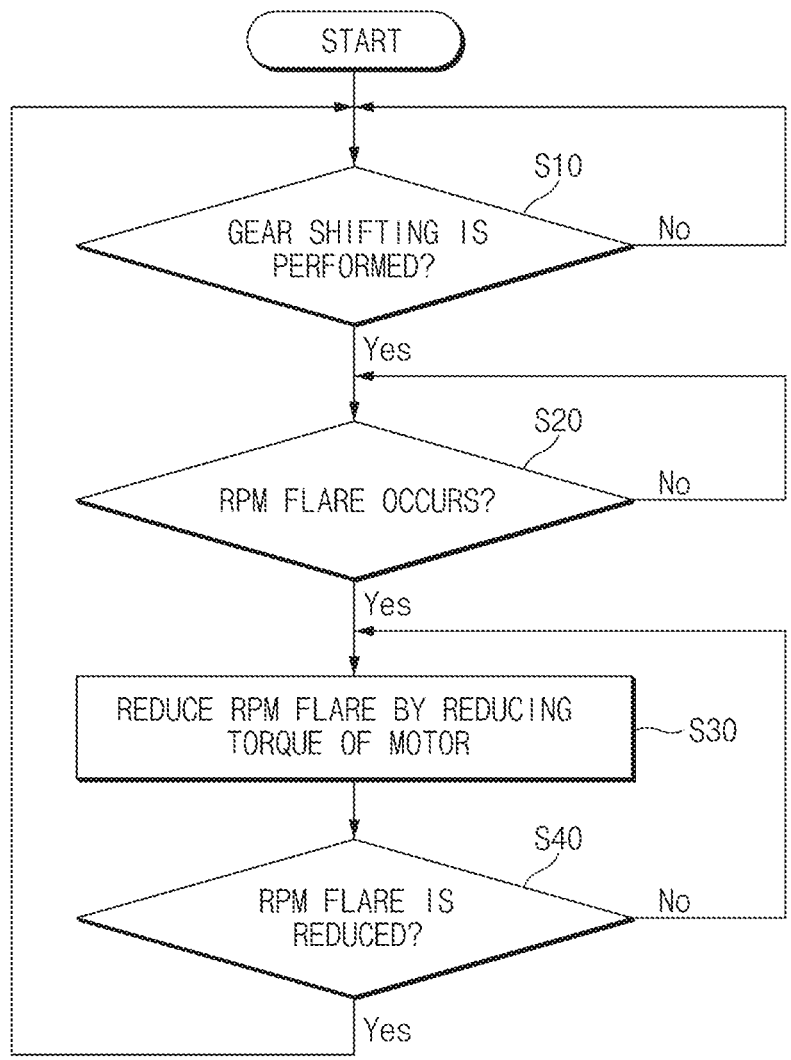
FIG. 2 is a flowchart illustrating a method of controlling RPM flare of a transmission for a hybrid vehicle, according to embodiments of the present invention.
Figure 3:
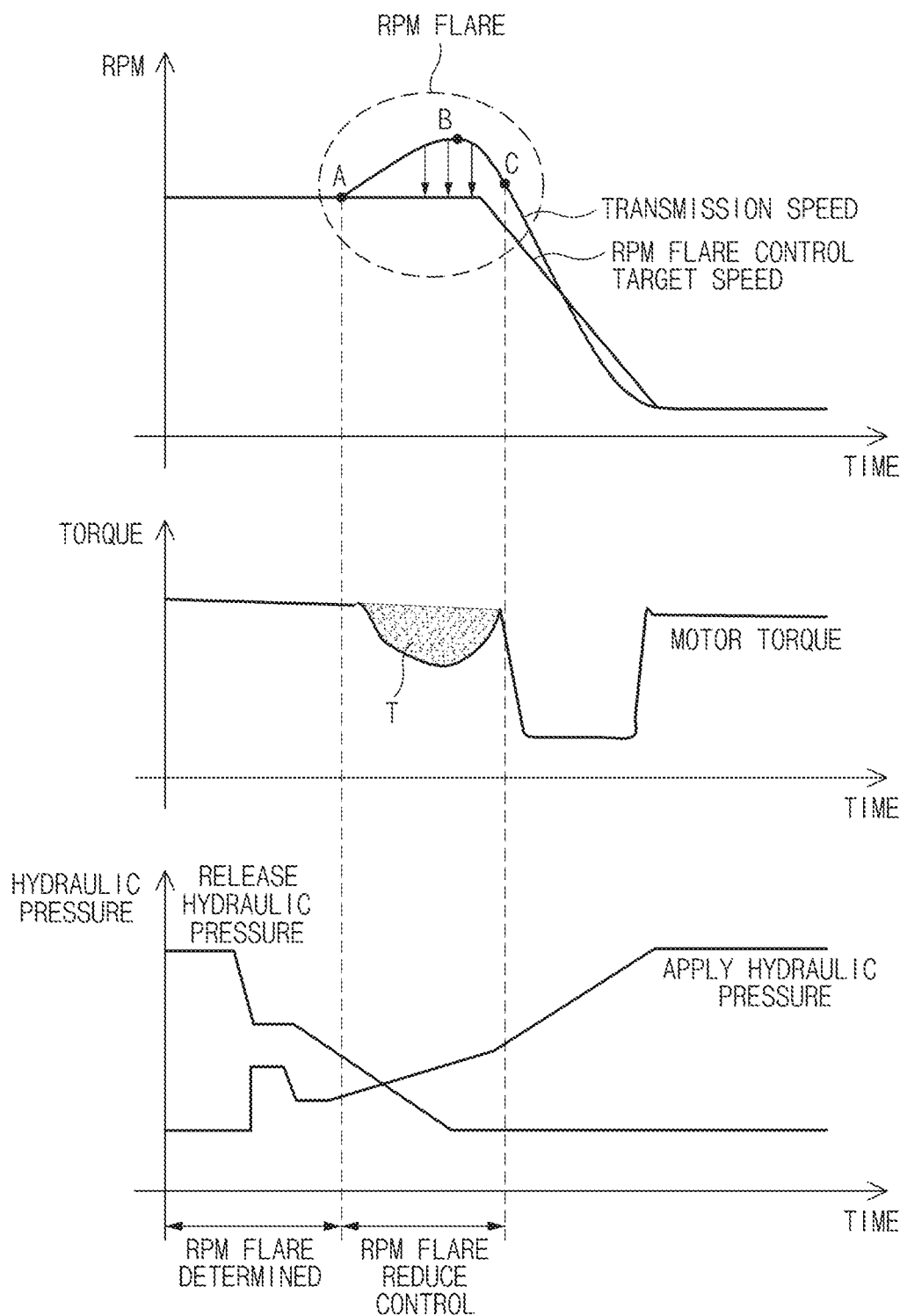
FIG. 3 is a graph illustrating a motor torque control state when the RPM flare resulting from upshifting occurs in the method of controlling the RPM flare of the transmission for the hybrid vehicle illustrated in FIG. 2.
Figure 4:
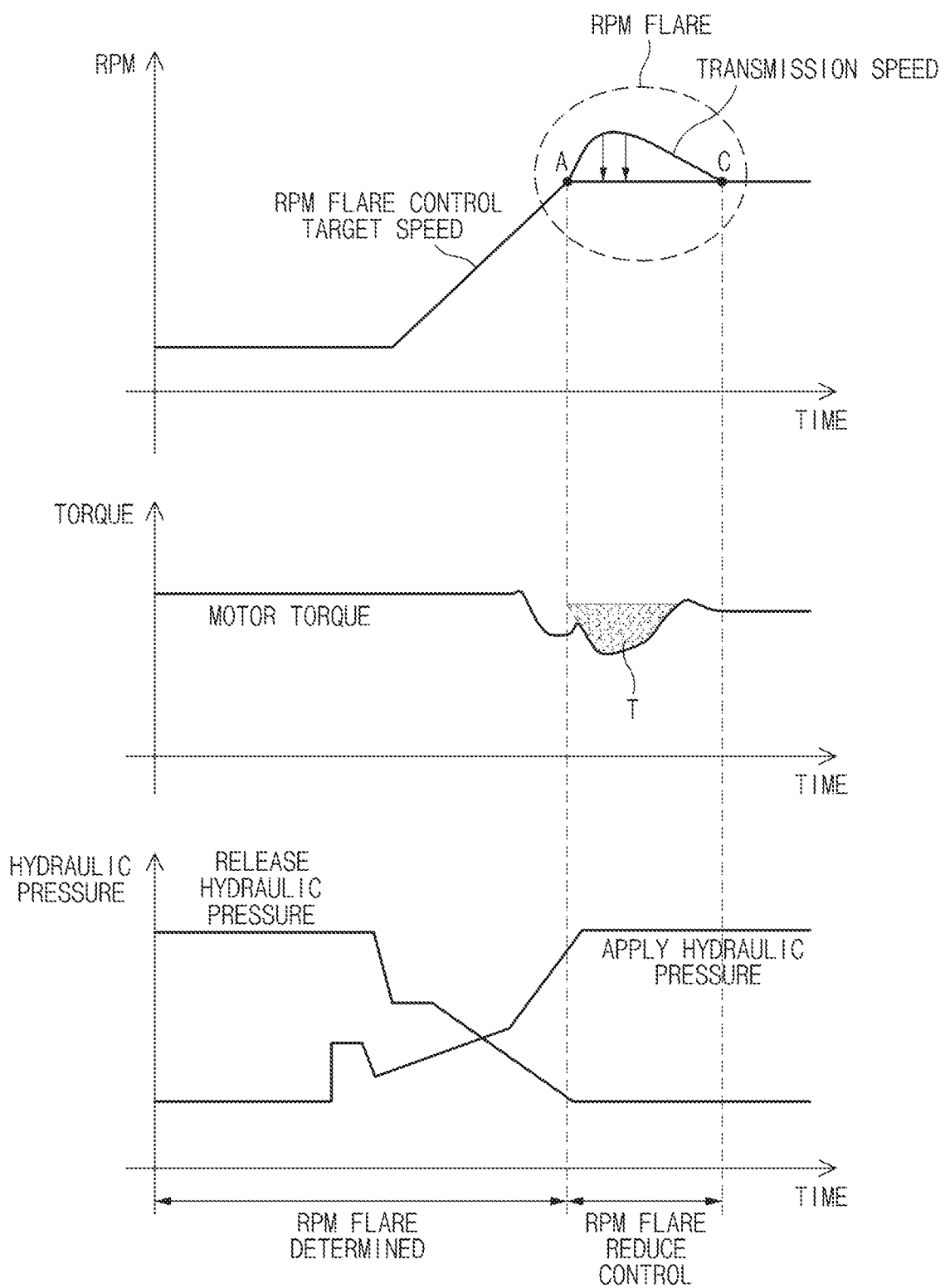
FIG. 4 illustrates graphs illustrating the motor torque control state when the RPM flare resulting from the down-shifting occurs, in the method of controlling the RPM flare of the transmission for the hybrid vehicle illustrated in FIG. 2.
Figure 5:
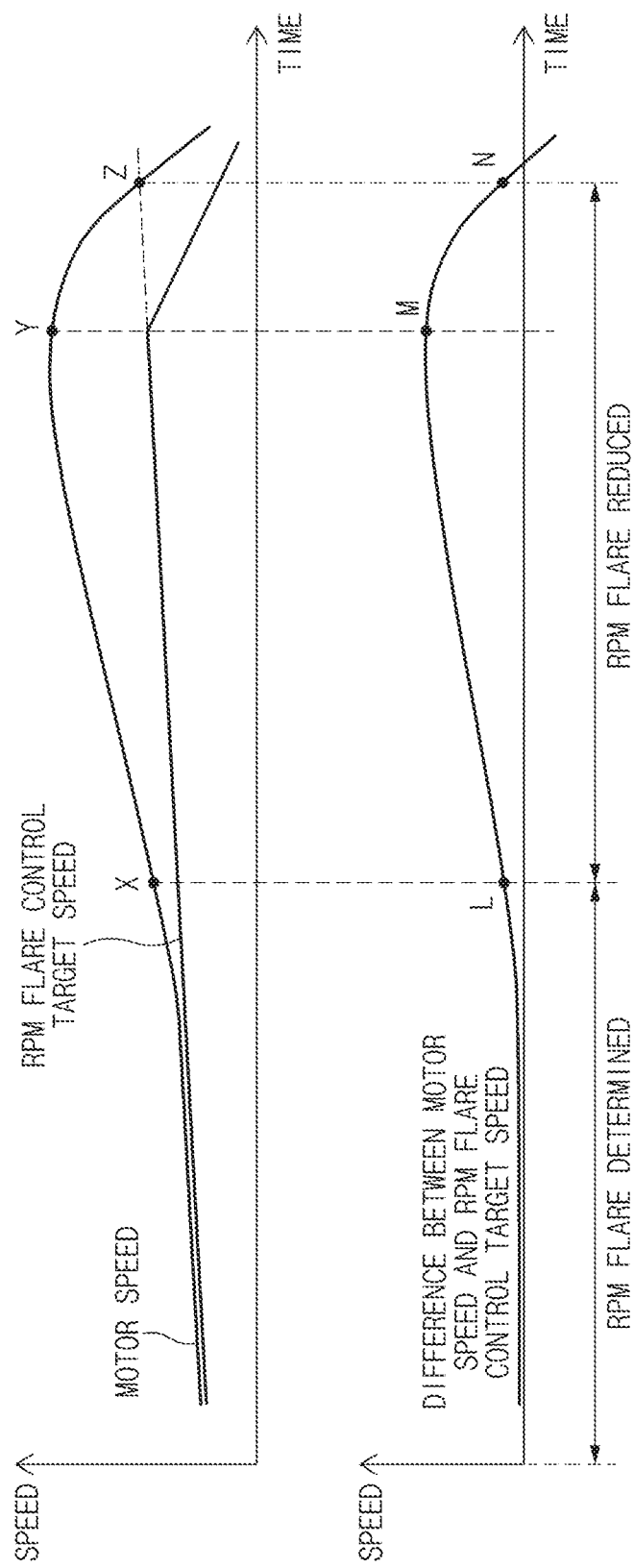
FIG. 5 illustrates graphs showing the RPM flare control stage according to the motor speed and RPM flare control target speed, in the method of controlling the RPM flare of the transmission for the hybrid vehicle illustrated in FIG. 2.

Referring now to the presently disclosed embodiments, FIG. 1 is a schematic view illustrating the elements of a typical hybrid vehicle, FIG. 2 is a flowchart illustrating a method of controlling RPM flare of a transmission for a hybrid vehicle, according to embodiments of the present invention, FIG. 3 is a graph illustrating a motor torque control state when the RPM flare resulting from upshifting occurs in the method of controlling the RPM flare of the transmission for the hybrid vehicle illustrated in FIG. 2, FIG. 4 illustrates graphs illustrating the motor torque control state when the RPM flare resulting from the downshifting occurs, in the method of controlling the RPM flare of the transmission for the hybrid vehicle illustrated in FIG. 2, and FIG. 5 illustrates graphs showing the RPM flare control according to the motor speed and the RPM flare control target speed, in the method of controlling the RPM flare of the transmission for the hybrid vehicle illustrated in FIG. 2.

According to embodiments of the present disclosure, the method of controlling the RPM flare of the transmission for the hybrid vehicle is provided to reduce the RPM flare by controlling the torque of the motor engaged with the transmission when RPM flare occurs. As would be understood by a person possessing an ordinary level of skill in the art, RPM flare can occur when the RPM of the hybrid vehicle transmission rapidly increases due to clutch slip in gear-shifting during driving.

Hereinafter, the method of controlling the RPM flare of the transmission for the hybrid vehicle will be described after describing the schematic structure of the hybrid vehicle, for the convenience of explanation.

Referring first to FIG. 1, the hybrid vehicle may include an engine 1, a motor 2, an engine clutch 3, a transmission 4, a hybrid control unit (HCU) 10, a motor control unit (MCU) 20, and a transmission control unit (TCU) 30.

The engine 1 and the motor 2 provide driving force as a power source of the hybrid vehicle. The engine clutch 3 is interposed between the engine 1 and the motor 2 to distribute power of the engine 1 and the motor 2 depending on operating modes.

The transmission 4 can control a gear stage in response to a TCU 30 connected with the HCU 10 to be described below through a network. An inner clutch (hereinafter, referred to as "clutch") is provided inside the transmission 4 to apply or release hydraulic pressure according to gear-shifting.

The HCU 10 controls the output torque of the engine 1 and the motor 2 by integrally controlling control units, which are provided in the hybrid vehicle, through the network depending on driving demands and vehicle states. The HCU 10 controls the driving of an electric vehicle mode (EV), a hybrid vehicle mode (HEV), and an engine mode by controlling the engine clutch 3 depending on driving conditions and statues of a battery. The HCU 10 is connected with an engine control unit (ECU) 40, which controls the operation of the engine 1, to request for the torque correction of the engine 1.

The MCU 20 may control the driving of the motor 2 under the control of the HCU 10 and may store electricity, which is generated from the motor 2, into the battery in a regenerative braking control mode.

The TUC 30 may apply or release hydraulic pressure to or from the transmission 4 by controlling the gear stage of the transmission 4 under the control of the HCU 10 and by controlling an inner clutch according to gear-shifting.

Referring next to FIG. 2, according to embodiments of the present disclosure, the method of controlling the RPM flare of the transmission for the hybrid vehicle may include: operation S10 of determining whether gear-shifting is performed in the transmission 4 for the hybrid vehicle; operation S20 of determining whether the RPM flare occurs in the transmission 4 when the transmission 4 performs the gear-shifting; and operation S30 of reducing the RPM flare of the transmission 4 by controlling the torque of the motor 2, which transmits power to the transmission 4, when the RPM flare occurs.

First, operation S10 is performed to determine whether the transmission 4 of the hybrid vehicle is gear-shifting (e.g., upshifting and downshifting). Operation S10 is performed by determining whether the transmission 4 of the vehicle is in a state of performing gear-shifting. The determining of whether the transmission 4 of the vehicle is in a state of performing the gear-shifting may be performed by the TCU 30.

In operation S10, the gear-shifting may include upshifting or downshifting. The upshifting is power-on up shifting in which the gear stage is changed upward as the vehicle is accelerated. The downshifting is power-on down shifting in which the gear stage is changed downward as higher power is required for vehicle acceleration.

In operation S10, when it is determined that the transmission 4 of the vehicle is in the state of gear-shifting, operation S20 is performed. On the other hand, when it is determined that the transmission 4 of the vehicle is not the state of gear-shifting, operation S10 is re-performed.

Next, operation S20 is performed to detect whether the RPM flare occurs in the transmission 4 when the gear-shifting is performed in operation S10. Whether the RPM flare occurs is detected by the TCU 30 or the MCU 20.

The RPM flare refers to a phenomenon in which, as the clutch is open due to clutch slip in the transmission 4, an RPM of the transmission 4 rapidly increases during gear-shifting. Such RPM flare makes a difference from RPM increase by typical hydraulic pressure in terms of a degree of RPM increase.

The occurrence of RPM flare is detected by comparing the difference between the RPM of the motor 2 and a RPM flare control target speed with a specific RPM flare reference speed as expressed below in Equation 1. The RPM of the motor 2 is detected through the MCU 20. Further, since a transmission input speed in a normal driving state is the RPM of the motor 2, the transmission input speed is controlled by using motor torque such that the RPM of the motor 2 is controlled to be an RPM flare control target speed when the RPM flare occurs.

In this case, a specific RPM flare reference speed for determining the RPM flare, is within the range of several tens of RPMs and is actually mapped by taking into consideration the sense of the gear-shifting in a vehicle. Accordingly, the specific RPM flare reference speed is not predefined.

$$|\text{RPM of motor} - \text{RPM flare control target speed}| > \text{specific RPM flare reference speed} \qquad \text{Equation 1:}$$

In other words, when the difference between the RPM of the motor 2, in a driving state, and the RPM flare control target speed is greater than the specific RPM flare reference speed of the transmission 4, since the RPM increase may be inferred based on the difference in RPM, it is detected that the RPM flare occurs in the transmission 4. For example, when the RPM of the motor 2 is 2000 rpm, the RPM flare control target speed is 1500 rpm, and the specific RPM flare reference speed is 400 rpm, it is determined through Equation 1 that the RPM flare occurs in the transmission 4.

Regarding the detection of RPM flare, it may be determined that the RPM flare occurs at a point A that a transmission speed exceeds a reference speed as illustrated in FIG. 3, an X point that the motor speed exceeds the RPM flare control target speed as illustrated in FIG. 5, and an L point that the slop to the difference between the motor speed and the RPM flare control target speed is increased.

In contrast, when the RPM of the motor 2 is equal to the RPM flare control target speed, or when the difference between the RPM of the motor 2 and the RPM flare control target speed is less than the specific RPM flare reference speed of the transmission 4, the RPM is not increased or an RPM increase degree is slightly represented. Accordingly, it is determined that the RPM flare does not occur in the transmission 4.

In this case, the RPM flare control target speed of the transmission 4 is calculated through Equation 2 below.

$$\text{RPM flare control target speed} = (\text{output RPM of transmission}/\text{current driving gear ratio of transmission}) \times \text{LPF.} \qquad \text{Equation 2:}$$

In this case, the LPF denotes a low-pass filter. Regarding the RPM flare control target speed of the transmission 4, the specific RPM flare reference speed of the transmission 4 based on the gear ratio and the output RPM may be calculated by dividing the output RPM of the transmission 4 by the gear ratio of the current driving gear. Then, the calculated value is multiplied by an LPF value to remove the value of included noise when the specific RPM flare reference speed of the transmission 4 is calculated. Meanwhile, generally, since the output RPM (i.e., a sensor value detected through an output speed sensor) of the transmission 4 includes a noise component, the LPF is used and a high-frequency noise component is removed.

If the difference between the RPM of the motor 2 and the RPM flare control target speed is greater than the specific RPM flare reference speed in operation S20, the RPM flare is detected in the transmission 4 and thus operation S30, which is to be described below. Then, when the difference between the RPM of the motor 2 and the RPM flare control target speed is not greater than the specific RPM flare reference speed, operation S20 is performed again.

Then, operation S30 is to reduce the RPM flare of the transmission 4 by controlling the motor 2 transmitting power to the transmission 4 to reduce the torque of the motor 2 when it is determined that the RPM flare occurs in the transmission 4 in operation S20. The control of the motor 2 to reduce the torque of the motor is performed by the MCU 20.

In this case, the torque of the motor 2 is controlled to reduce the RPM flare occurring in the transmission 4. This is because the transmission 4 and the motor 2 are synchronized with each other and rotate together. Accordingly, when the torque of the motor 2 is reduced, the RPM of the transmission 4 is naturally reduced and thus the RPM flare is reduced.

Meanwhile, as illustrated in FIG. 3, when the RPM flare occurs at the point A in upshifting, the torque of the motor 2 is actively controlled to be reduced based on an RPM flare degree until a point B that the RPM flare is maximized. Therefore, in operation S30, the RPM flare may be reduced by reducing the torque by T as illustrated in FIG. 3. In this case, the wording "maximization" is used to express the RPM flare state, and a plurality of points may be formed.

Hereinafter, the time point that the RPM flare occurs will be described based on a motor speed as illustrated in FIG. 5. The RPM flare occurs at the point X that the slope of the motor speed becomes equal to or greater than a specific slot. In this case, the torque of the motor 2 is reduced through the MCU 20 until the slop of the motor speed is reduced from a point Y such that the RPM flare is reduced after predetermined time elapses. Meanwhile, although the RPM flare becomes reduced at points Y and Z that the slope of the motor speed is decreased to be equal to or less than a specific slop or at points M and N that the slop of the difference between the motor speed and the RPM flare control target speed is decreased to be less than a specific slop, the RPM flare still remains and is not sufficiently reduced.

When the RPM flare is reduced (after the point C in FIG. 3 and after points Z and N in FIG. 5) by controlling the torque of the motor 2 to be reduced (e.g., see reference sign T in FIG. 3), the increased RPM of the transmission 4 is recovered to a specific RPM and the motor speed and the motor torque are recovered to the motor speed and the motor torque before the RPM flare occurs.

FIG. 4 illustrates the RPM flare, in which the RPM is abruptly increased due to the clutch slip resulting from the downshifting of the gear, and, when the RPM flare occurs at the point A as shown in upshifting of the gear, the torque of the motor 2 is reduced to the point C to reduce the RPM flare.

Meanwhile, in the method of controlling the RPM flare of the transmission for the hybrid vehicle, operation S30 may include operation S40 of determining whether the RPM flare is sufficiently reduced in the transmission 4 or the motor. The determination of the absence of RPM flare reduction is performed by the TCU 30 or the MCU 20.

The determination of whether the RPM flare is eliminated is performed to determine whether the RPM flare is maintained in the elimination state or occurs again after operation S30.

The determination of whether the RPM flare is reduced is performed by comparing the difference between the RPM of the motor 2 and the RPM flare control target speed with the specific RPM flare reference speed as expressed below in Equation 3.

|PPM of motor−RPM flare control target speed|≤specific RPM flare reference speed   Equation 3:

In other words, when the RPM of the motor 2 is equal to the RPM flare control target speed or the difference between the RPM of the motor 2 and the RPM flare control target speed is less than the specific RPM flare reference speed, since the RPM is not increased or the slight RPM increase is made, it is determined that the RPM flare is sufficiently reduced in the transmission 4. For example, when the RPM of the motor 2 is 2000 rpm, the RPM flare control target speed is 1800 rpm, and the specific RPM flare reference speed is 400 rpm, it is determined through Equation 3 that the RPM flare is sufficiently reduced in the transmission 4.

In contrast, when the difference between the real RPM of the motor 2 during the driving and the RPM flare control target speed is greater than the specific RPM flare reference speed, since the RPM increase may be inferred based on the difference in RPM, it is determined that the RPM flare occurs again in the transmission 4.

When it is determined in operation S40 that the RPM flare is sufficiently reduced, operation S10 is performed. When it is determined in operation S40 that the RPM occurs again, operation S30 is performed.

As described above, in the method of controlling the RPM flare of the transmission for the hybrid vehicle according to embodiments of the present disclosure, when the RPM flare occurs in the transmission, the RPM flare may be reduced by controlling the motor torque, and thus fuel efficiency may be improved. Accordingly, the drivability may be improved by improving the speed of the transmission and the shift quality.

Hereinabove, although the present disclosure has been described with reference to certain embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A method for controlling revolutions per minute (RPM) flare, in which an RPM of a transmission increases due to clutch slip, for a hybrid vehicle, the method comprising:
   determining whether gear-shifting is performed in a transmission of the hybrid vehicle;
   detecting whether RPM flare of the transmission occurs when it is determined that the gear-shifting is performed; and
   controlling a torque of a motor of the hybrid vehicle so as to reduce the RPM flare of the transmission by reducing the torque of the motor when the RPM flare of the transmission is detected,
   wherein the detecting of whether the RPM flare of the transmission occurs comprises:
      determining that the RPM flare of the transmission occurs when a difference between an of the motor and an RPM flare control target speed of the transmission is greater than a specific RPM flare reference speed of the transmission; and
      calculating the RPM flare control target speed of the transmission according to the following equation:

RPM flare control target speed=an output RPM of a transmission/current driving gear ratio of the transmission×LPF, wherein "LPF" denotes a low-pass filter.

2. The method of claim 1, wherein the controlling of the torque of the motor comprises:
   reducing the torque of the motor based on a degree of the RPM flare of the transmission until a time at which the RPM flare of the transmission is maximized.

3. The method of claim 2, wherein the controlling of the torque of the motor further comprises:

after the RPM flare of the transmission is reduced, recovering the torque of the motor to a value of the torque of the motor before the RPM flare of the transmission occurred.

4. The method of claim 1, further comprising:
determining whether the RPM flare of the transmission is sufficiently reduced after reducing the RPM flare of the transmission.

5. The method of claim 4, further comprising:
determining whether the gear-shifting is performed in the transmission when the RPM flare of the transmission is sufficiently reduced; and
controlling the torque of the motor so as to reduce the RPM flare of the transmission when the RPM flare of the transmission is present.

6. The method of claim 1, wherein the gear-shifting includes upshifting or downshifting.

* * * * *